(No Model.) 2 Sheets—Sheet 1.

L. N. PETERSEN, M. L. HARKSEN & H. HAGGE.
ROTARY HARROW.

No. 326,775. Patented Sept. 22, 1885.

Witnesses:
Chas. E. Gaylord.
Mason Bross.

Inventors:
Louis N. Petersen
Martin L. Harksen and
Henry Hagge,
By Dyrenforth and Dyrenforth,
Attys (No Model.) 2 Sheets—Sheet 2.
L. N. PETERSEN, M. L. HARKSEN & H. HAGGE.
ROTARY HARROW.

No. 326,775. Patented Sept. 22, 1885.

UNITED STATES PATENT OFFICE.

LOUIS N. PETERSEN, MARTIN LUDWIG HARKSEN, AND HENRY HAGGE, OF BRYANT, IOWA.

ROTARY HARROW.

SPECIFICATION forming part of Letters Patent No. 326,775, dated September 22, 1885.

Application filed June 1, 1885. (No model.)

*To all whom it may concern:*

Be it known that we, LOUIS N. PETERSEN, MARTIN L. HARKSEN, and HENRY HAGGE, citizens of the United States, residing at Bryant, in the county of Clinton and State of Iowa, have invented certain new and useful Improvements in Harrows; and we hereby declare the following to be a full, clear, and exact description of the same.

Our invention relates particularly to rotary harrows which are caused to rotate when dragged over ground, which it is designed to prepare by leveling or stirring the soil, destroying weeds, or covering seed by means of a weight, which weight in some cases is capable of being shifted to cause the rotation to occur in a desired direction, and is secured eccentrically upon the device, whereby the teeth of the harrow on the same side with the weight are caused to sink into the ground to a depth proportionate to the weight, thus affording the resistance as the machine is drawn along which produces desired rotation. It is not, however, always wished to occasion this rotary movement of the harrow, particularly where the soil does not require vigorous treatment to render it properly fit for a desired purpose; or, owing to its condition, the teeth of the harrow may sink into it to a sufficient depth without the imposition of a great weight, in either of which cases a fixed weight suitable for soil of a nature considerably refractory, possesses a disadvantage, inasmuch as it subjects the animals employed in dragging the device to unnecessary exertion. It is our object to avoid this disadvantage, and also to decrease the strain upon the animals in pulling by shortening the pull; and it is further our object to afford means whereby the draft-beam may be readily adjusted to cause the teeth of the harrow to run deep or shallow, and to afford a device which shall thoroughly granulate all soil within the area over which it moves.

Our invention consists in the construction whereby the foregoing objects are accomplished; and our invention further consists in certain details of construction and combinations of parts, all as hereinafter particularly set forth.

Figure 1:
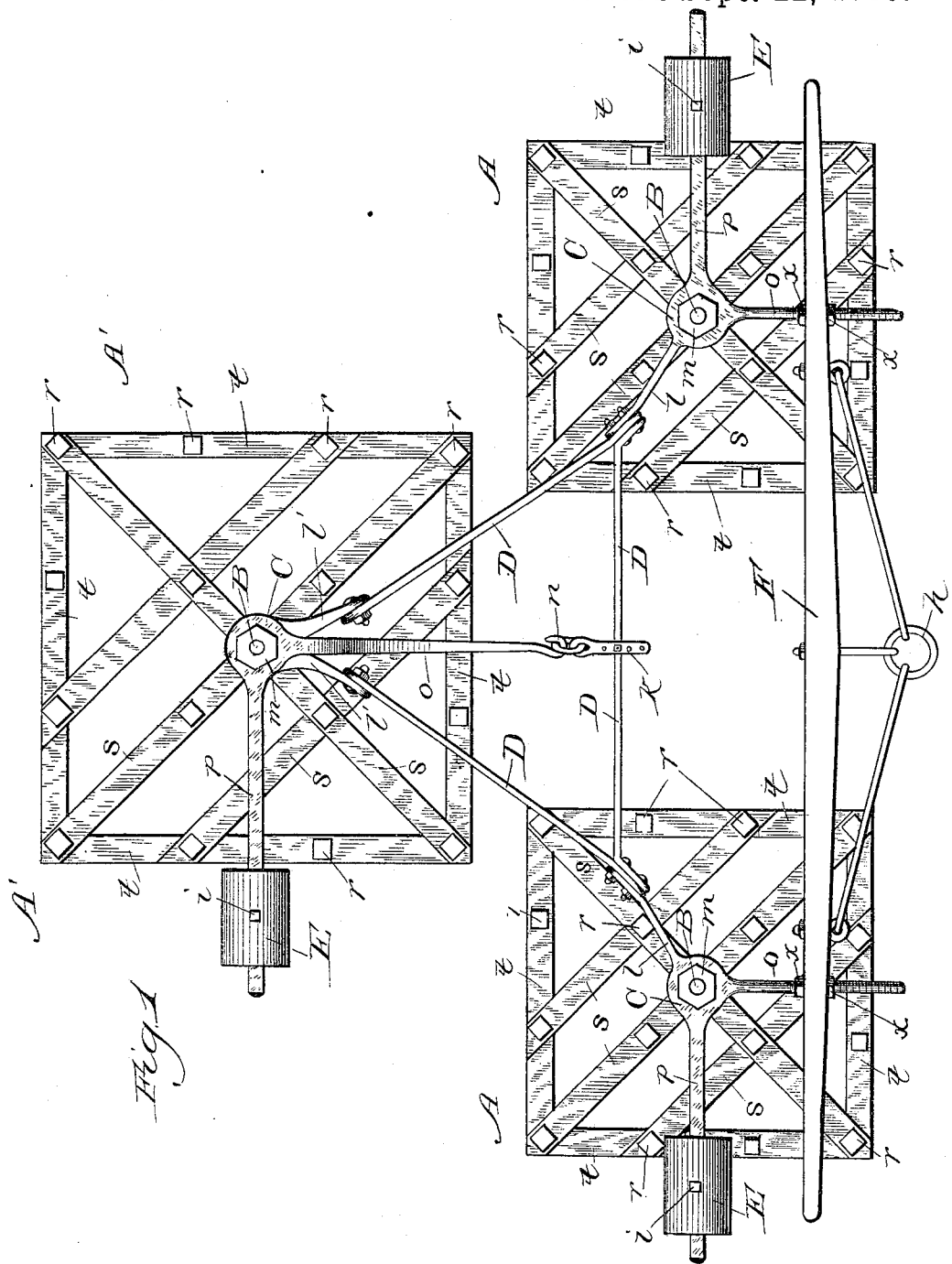
Figure 2:
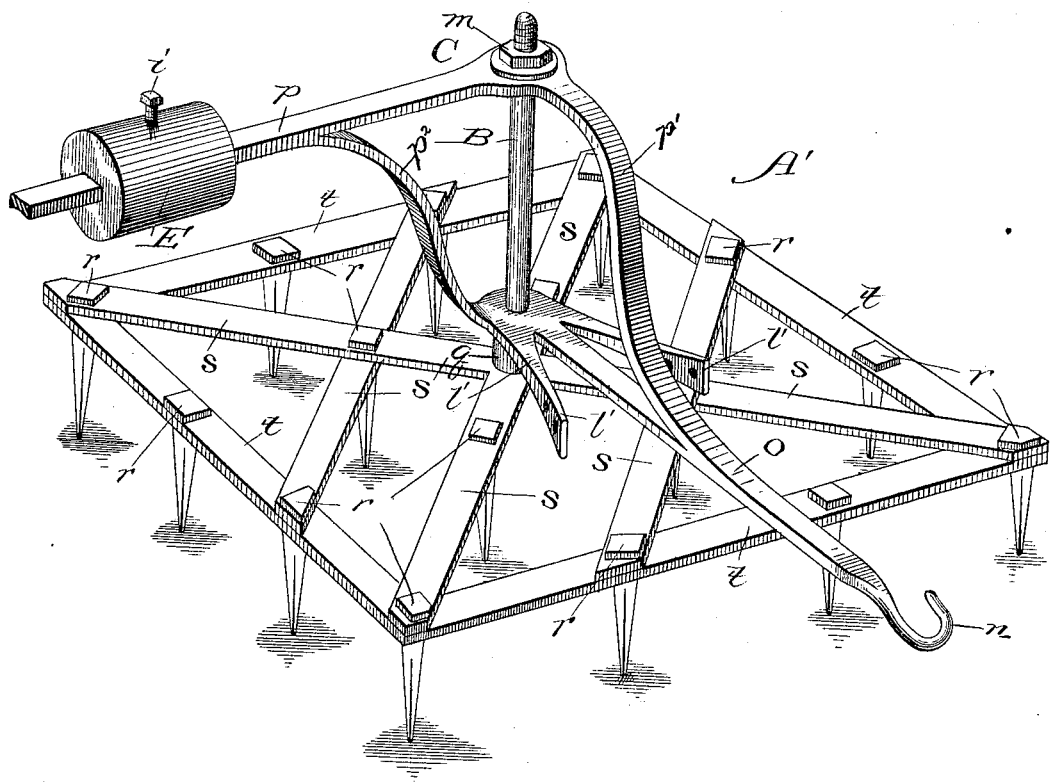

Referring to the drawings, Figure 1 is a plan view of our improved device; and Fig. 2, a perspective view of the rear section, showing the construction of the bracket.

A A are the forward sections of the harrow, both being preferably of the same size and shape, and comprising each a square frame formed of bars $t$, preferably of iron, provided with diagonal cross-pieces $s$, through which and the bars $t$ the teeth $r$ of usual or any desired form are inserted.

A' is the rear section, in form like the sections A, but somewhat larger than these, and also having cross-pieces $s$ and teeth $r$, some of which, as in the sections A, rivet the cross-pieces to the frame, and connected with the forward sections, whereby the latter are connected together, all in the manner hereinafter described. Each section is provided at its center on its upper side with a vertical arbor, B, provided with a shoulder, $q$, (Shown in Fig. 2.)

C C are brackets upon the sections comprising each an arm, $p$, and downwardly-curved brace $p'$ projecting at a right angle from its rear extremity, an arm, $o$, welded on its upper sides to the lower extremity of the brace $p'$. The arm $o$ of the bracket on the section has a hook, $n$, at its extremity to provide a draw-bar, but the arms on the forward sections are screw-threaded. A brace, $p^2$, curves upward from the rear extremity of the arm $o$, and is welded at its upper extremity on the bracket of the forward sections to the lower surface of the arm $p$, and an arm, $l$, on each, extends from the bracket on a level with the arm $o$, and, on the rear bracket, two arms, $l'$. These arms and braces thus all meet at a vertex through which openings are provided in line with each other, which permit a bracket to be slipped upon an arbor, B, on which it is supported by the shoulder $q$, and secured from removal by a nut, $m$. It will thus be seen, from the foregoing, that the arm $p$ is higher than the arms $o$, $l$, and $l'$, since it extends from the upper extremity of the bracket, while the latter extend from the lower extremity of the same.

D is a triangular rigid frame forming the connecting medium of the sections A A and A', by being bolted at its rear angle to the arms l' of the bracket C on the section A', and at its forward angles to the arms l of the brackets C on the forward sections, A, the hooked arm o of the bracket on the rear section being connected with a link, k, adjustably secured upon the base of the triangle at the center thereof. Upon the arm p of each bracket C a weight, E, having an opening formed longitudinally through its center, is detachably adjusted, and is provided with a thumb-nut, i, which enables it to be secured in an adjusted position. The screw-threaded ends of the arms o of the brackets on the forward sections of the harrow are passed through the draft-beam F, as shown, which is provided, in line with its center, with a ring, h, connected with the draft-beam, and to which the animal is hitched, and nuts x are provided upon the screw-threads of the arms o, by turning of which the draft-beam may be moved backward toward or forward from the centers of the forward sections, A, whereby they may be caused to run "deep" or "shallow." The draft, as will be seen, is exerted upon the brackets C, which are thus stationary, while the weights E will cause the sections to revolve, the resistance whereby the revolution is produced being gaged by the adjustment of the weights toward or from the centers of the sections; and, if it is not desired to have the latter revolve, the weights E may be entirely removed.

By having the sections arranged as shown and described the strain upon the animals is much less than it would be were four sections connected in the form of a rectangle, and by having the third section in rear of the space separating the forward ones, and somewhat wider than the latter, to overlap them, it will disintegrate soil that may escape the teeth of the sections or be thrown by them before it. The square form of the section is preferable to a circular form, (which, however, may be used,) inasmuch as the area traversed in the rotation by the line of its diagonal section is greater than that traversed by a circular one having a diameter equal to that of the square.

What I claim as new, and desire to secure by Letters Patent, is—

1. A rotary harrow, comprising, in combination, two forward sections, A, provided with vertical arbors B, brackets C, supported on the arbors B and provided with arms p for carrying adjustable weights, and with arms o, screw-threaded toward their extremities to pass through the draft-beam F, adjustable thereon by means substantially as described, a section, A', provided with a vertical arbor, B, a bracket, C, supported upon the said arbor B, and provided with an arm, p, for carrying an adjustable weight, and with an arm, o, and means, substantially as described, connecting the bracket C on the section A' with the brackets C on the forward sections, A, whereby the rear section is maintained centrally behind the forward sections, the whole being constructed and arranged to operate as and for the purpose set forth.

2. A rotary harrow, comprising, in combination, two forward sections, A, provided with vertical arbors B, brackets C, supported on the arbors B and provided with arms p, carrying adjustable weights E, and with arms o, screw-threaded toward their extremities, a draft-beam, F, adjustable on the screw-threaded portions of the said arms o by means of nuts x, a section, A', provided with a vertical arbor, B, a bracket, C, supported on the said arbor B and provided with an arm, p, carrying an adjustable weight, E, and with a hooked arm, o, and a frame, D, connecting the brackets C on the forward sections, A, with the bracket C on the rear sections, A', the whole being constructed and arranged to operate substantially as described.

3. A rotary harrow, comprising, in combination, two forward square sections, A, provided with vertical arbors B, brackets C, supported on the arbors B and provided with arms p and l, weights E, detachable from and adjustable on the said arms p, arms o on the said brackets C, screw-threaded toward their extremities, a draft-beam, F, adjustable on the screw-threaded portions of the said arms o by means of nuts x, a square section, A', larger than a section, A, and provided with a vertical arbor, B, a bracket, C, supported on the said arbor B, and provided with arms p and l', a weight, E, detachable from and adjustable on the said arm p, a hooked arm, o, extending from the said bracket, and a triangular frame, D, connecting together the arms l and l' of the brackets on the sections A and A', and carrying an adjustable link, k, to engage with the hooked end of the arm o of the bracket on the rear section, A', the whole being constructed and arranged to operate substantially as described.

LOUIS N. PETERSEN.
MARTIN LUDWIG HARKSEN.
HENRY HAGGE.

In presence of—
EMIL N. NAGEL,
FRED N. NAGEL.